US011800363B2

(12) United States Patent
Pickering et al.

(10) Patent No.: US 11,800,363 B2
(45) Date of Patent: Oct. 24, 2023

(54) METHODS AND SYSTEMS FOR OBFUSCATING ENTRY OF SENSITIVE DATA AT A POINT-OF-SALE (POS) DEVICE

(71) Applicant: Worldpay, LLC, Symmes Township, OH (US)

(72) Inventors: Daren L Pickering, Rugby (GB); Jonathan Stewart Vokes, London (GB); Marc Massar, Coxheath (GB); Danny K. Russell, London (GB)

(73) Assignee: Worldpay, LLC, Symmes Township, OH (US)

( * ) Notice: Subject to any disclaimer, the term of this patent is extended or adjusted under 35 U.S.C. 154(b) by 77 days.

(21) Appl. No.: 17/534,334

(22) Filed: Nov. 23, 2021

(65) Prior Publication Data

US 2022/0086647 A1 Mar. 17, 2022

Related U.S. Application Data

(63) Continuation of application No. 16/235,179, filed on Dec. 28, 2018, now Pat. No. 11,259,184.

(51) Int. Cl.
*G06F 21/62* (2013.01)
*H04W 12/30* (2021.01)
*G06Q 20/32* (2012.01)
*H04W 12/128* (2021.01)

(52) U.S. Cl.
CPC ........ *H04W 12/30* (2021.01); *G06F 21/6245* (2013.01); *G06Q 20/3278* (2013.01); *H04W 12/128* (2021.01)

(58) Field of Classification Search
CPC ... H04W 12/30; H04W 12/128; H04W 12/02; H04W 12/03; G06F 21/60; G06F 21/62; G06F 21/6245; G06F 21/6254; G06F 21/82; G06F 21/83; G06Q 20/3226; G06Q 20/3278
See application file for complete search history.

(56) References Cited

U.S. PATENT DOCUMENTS

| 6,798,887 | B1 | 9/2004 | Andre |
| 10,009,341 | B1 | 6/2018 | Vieux et al. |
| 10,599,222 | B2 | 3/2020 | Bench et al. |
| 2007/0165001 | A1 | 7/2007 | Boss et al. |
| 2007/0234380 | A1 | 10/2007 | Sahasrabudhe et al. |
| 2008/0072331 | A1 | 3/2008 | Dickson et al. |

(Continued)

OTHER PUBLICATIONS

Newcastle University. (Apr. 11, 2017). How criminals can steal your PIN by tracking the motion of your phone. Retrieved Dec. 26, 2018 from https://www.ncl.ac.uk/press/articles/archive/2017/04/sensors/.

*Primary Examiner* — Malcolm Cribbs
(74) *Attorney, Agent, or Firm* — Bookoff McAndrews, PLLC

(57) ABSTRACT

Systems and methods are disclosed for obfuscating entry of sensitive data at a mobile device, which may be infected with a rogue application configured to steal the sensitive data. One method comprises detecting a prompt for a user to enter sensitive data at a mobile device, and activating one or more of an audio speaker and a vibration motor of the mobile device. The activation of the one or more of the audio speaker and the vibration motor is terminated in response detection conclusion of the user's entry of sensitive data the mobile device.

20 Claims, 5 Drawing Sheets

(56) References Cited

U.S. PATENT DOCUMENTS

| | | |
|---|---|---|
| 2011/0016326 A1 | 1/2011 | Craig et al. |
| 2012/0316869 A1 | 12/2012 | Xiang et al. |
| 2013/0298246 A1 | 11/2013 | Cragun et al. |
| 2014/0196158 A1* | 7/2014 | Buck ................ G06F 21/31 |
| | | 726/30 |
| 2015/0264572 A1 | 9/2015 | Turgeman |
| 2016/0180656 A1 | 6/2016 | Loose et al. |
| 2018/0184286 A1* | 6/2018 | Patterson ............. H04W 12/02 |
| 2018/0277134 A1 | 9/2018 | Goodwin et al. |
| 2019/0220588 A1* | 7/2019 | Agarwal ............... G06F 3/016 |
| 2020/0151341 A1 | 5/2020 | Xu |

\* cited by examiner

METHODS AND SYSTEMS FOR OBFUSCATING ENTRY OF SENSITIVE DATA AT A POINT-OF-SALE (POS) DEVICE

CROSS-REFERENCE TO RELATED APPLICATION(S)

This patent application is a continuation of and claims the benefit of priority to U.S. application Ser. No. 16/235,179 filed on Dec. 28, 2018, the entirety of which is incorporated herein by reference.

TECHNICAL FIELD

The present disclosure relates to methods and systems for obfuscating entry of sensitive data at a mobile device. More particularly, the present disclosure relates to methods and systems for obfuscating entry of sensitive data such as, for example, a personal identification number (PIN), to prevent a rogue application from harvesting the sensitive data.

BACKGROUND

Mobile devices, such as smartphones and tablets, are becoming more capable of various functions based on the development of hardware, software, and accessories. One such capability is the processing of a transaction between a customer and a merchant using a mobile device. Typically, a merchant uses a mobile device and an accessory device to read information from a customers account card and then process the transaction through a third party authorization entity. A downloadable application can turn an ordinary mobile device into a mobile point-of-sale or mobile payment acquiring terminal. While mobile terminals enable more people to conduct electronic payment transactions in a convenient and flexible manner, security concerns involving mobile terminals are rising.

Thus, a need exists for improving security of mobile device usage in transactions involving and/or requiring entry of sensitive data. More particularly, there is a need for improving security of electronic payment transactions occurring through a mobile terminal.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for obfuscating entry of sensitive data at a mobile device, comprising: detecting a prompt for a user to enter sensitive data at the mobile device; activating one or more of an audio speaker and a vibration motor of the mobile device; detecting conclusion of the user's entry of sensitive data at the mobile device; and terminating the activation of the one or more of the audio speaker and the vibration motor of the mobile device.

One embodiment provides a system for obfuscating entry of sensitive data at a mobile device. The system may comprise one or more processors; and a non-transitory computer readable medium storing instructions which, when executed by the one or more processors, cause the one or more processors to perform a method comprising: detecting a prompt for a user to enter sensitive data at the mobile device; activating one or more of an audio speaker and a vibration motor of the mobile device; detecting conclusion of the user's entry of sensitive data at the mobile device; and terminating the activation of the one or more of the audio speaker and the vibration motor of the mobile device.

One embodiment provides a non-transitory computer readable medium for obfuscating entry of sensitive data at a mobile device. The non-transitory computer readable medium may store instructions that, when executed by one or more processors, cause the one or more processors to perform a method comprising: detecting a prompt for a user to enter sensitive data at the mobile device; activating one or more of an audio speaker and a vibration motor of the mobile device; detecting conclusion of the user's entry of sensitive data at the mobile device; and terminating the activation of the one or more of the audio speaker and the vibration motor of the mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
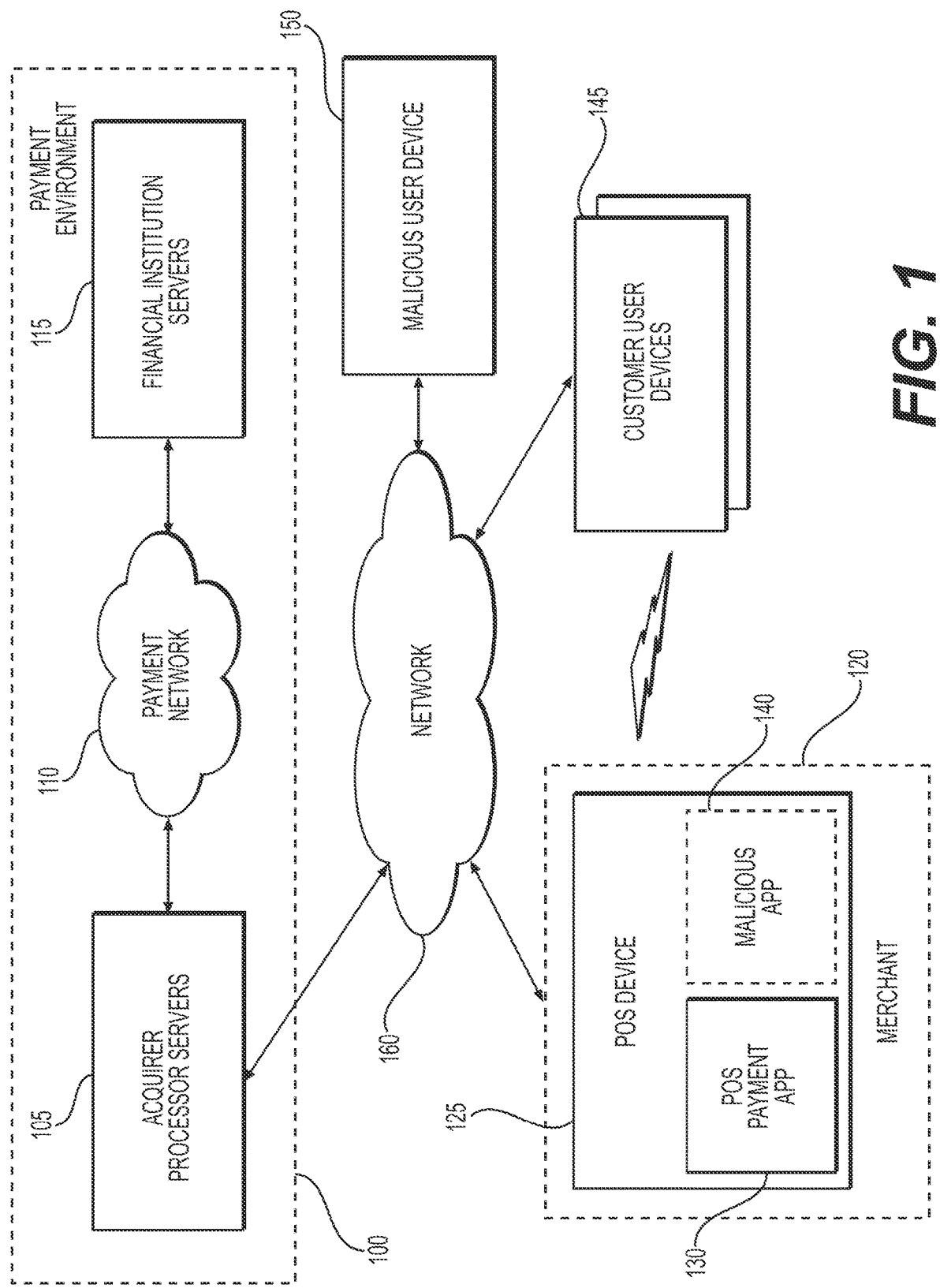
FIG. 1 depicts a block diagram of an electronic payment transaction processing system, according to one aspect of the present disclosure.

The following embodiments describe methods and systems for obfuscating entry of sensitive data at a mobile device and, more particularly, for sending signals, e.g., noise data, to various sensors and/or components of the mobile device to obfuscate entry of sensitive data.

With the wide spread use of mobile devices, many applications have been developed to enable mobile devices to perform various functions and transactions. For example, a downloadable software application can turn an ordinary mobile device into a mobile point-of-sale (POS) or mobile payment acquiring terminal (collectively, a "mobile terminal"). Using the mobile terminal, an electronic payment transaction can be initiated by a merchant who may take a payment electronically from a buyer. For certain transactions, an entry of user credentials (via a security challenge) may be required upon a buyer "swiping" or "tapping" a payment vehicle at the mobile terminal. If such a transaction is initiated at a merchant's mobile terminal, the security challenge may be presented on the merchant's mobile device. Thus, the merchant may be required to present or transfer the device to the buyer who may enter his/her user credentials. For example, the buyer may be requested to enter a personal identification number (PIN) associated with the payment vehicle.

To make this process more secure, the disclosed embodiment is directed to obfuscating entry of sensitive data at a mobile device. In one embodiment, the methods and systems of the present disclosure may first enable detection of a prompt for a user to enter sensitive data at a mobile device. Upon detecting the prompt, signals, e.g., noise data, may be sent to one or more device components or sensors, which may have been configured by a rogue application to provide sensor readings for determining (i.e., harvesting) the sensitive data. For example, in one embodiment, noise data may be generated by activating a speaker and/or a vibration motor of the mobile device. The generation of the noise data may be terminated upon detecting completion of the user's entry of sensitive data. The methods and systems of the present disclosure may be applicable to a variety of contexts, and may not be limited to the exemplary scenarios specifically discussed herein.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts a block diagram of an electronic payment transaction processing system, according to one aspect of the present disclosure. In general, FIG. 1 depicts a payment environment 100, a merchant 120, customer user device(s) 145, and a malicious user device 150, all connected via network 160. Network 160 may include the Internet, but may also include other networks such as a corporate WAN, cellular network, satellite network, or combination thereof, for example. The network 160 may be employed to enable data communications between the various entities illustrated in FIG. 1.

As shown in FIG. 1, in an electronic payment transaction processing system, a customer (i.e., a consumer), during a checkout process with a merchant 120, may make an electronic payment using a point-of-sale (POS) device 125. POS device 125 may comprise a computing system consistent with or similar to that depicted in FIG. 5. In one embodiment, POS device 125 may be a mobile device comprising a computing system consistent with or similar to that depicted in FIG. 5. The term "mobile device" used herein may refer to a smart phone, a table, a laptop, a smart watch, a wearable device, a gaming device, a handheld computer, a portable media player, or any other mobile or portable computing device. In some embodiments, POS device 125 may be configured to leverage an external card reader peripheral device to become an ad hoc point-of-sale (POS) platform, using POS payment application 130. POS device 125 may also be equipped with various sensors such as, for example, global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers).

A customer may provide a payment vehicle as a form of payment and the electronic payment transaction is processed through a payment environment 100. A payment vehicle may be embodied as a physical payment card (e.g., a traditional payment card such as a credit card, a debit card, a pre-paid card, a single-use card, etc.) or a virtual payment card (e.g., a digital wallet, etc.). The POS payment application 130 may be configured to process both types of payment vehicle using a built-in or peripheral device such as, for example, a magnetic card reader, a contactless reader, a contactless near field communication (NFC) reader, etc. Because merchant 120 generally can use a bank or financial institution that is different from that of the customer, an acquirer processor 105 handles the electronic payment transactions between the financial institution of the customer and that of the merchant 120. The customer may submit payment information at POS device 125 of merchant 120, such as by swiping his or her payment card, inserting his or her chip-based payment card, through wireless near field communication (NFC) (e.g., using a digital wallet via the customer user device 145), etc., or by any other suitable means. POS payment application 130 may then send an electronic payment request by way of a network 160 to an acquirer processor 105. Acquirer processor 105 may request, by way of payment network 110, an electronic transfer of funds to the financial institution server 115 associated with the merchant 120.

Under certain instances, the POS device 125 may not operate properly and/or in a secure manner, due to a malicious application 140 installed on the POS device 125. Malicious application 140 may be transmitted from a malicious user device 150 via the network 160. Malicious application 140 may be installed by a user of the POS device 125 (e.g., merchant 120, a rogue user of the POS device 125, etc.) knowingly, or the malicious application 140 may be installed by a malicious user device 150 unbeknownst to the merchant 120. In one embodiment, malicious application 140 may comprise a virus that interferes with the processing of the electronic payment transactions by the POS payment application 130. In another embodiment, malicious application 140 may be a rogue application that is configured to steal (i.e., harvest) sensitive data associated with the customer and/or the payment vehicle (e.g., PIN, password, answer to a security challenge at the POS device 125, payment account number, etc.). More particularly, a rogue application may run in the background of the POS device 125, monitor data captured by various sensors of the POS device 125 (e.g., gyroscope, accelerometer, magnetometer, etc.), and use the captured data to determine the PIN entered by the customer. The rogue application may utilize a machine learning model to predict the PIN, the machine learning model having been trained using sensor data captured during numerous test PIN entry sessions. Using the machine learning model, the rogue application may be able to predict each digit entered by the user at an acceptable rate of accuracy.

Figure 2:
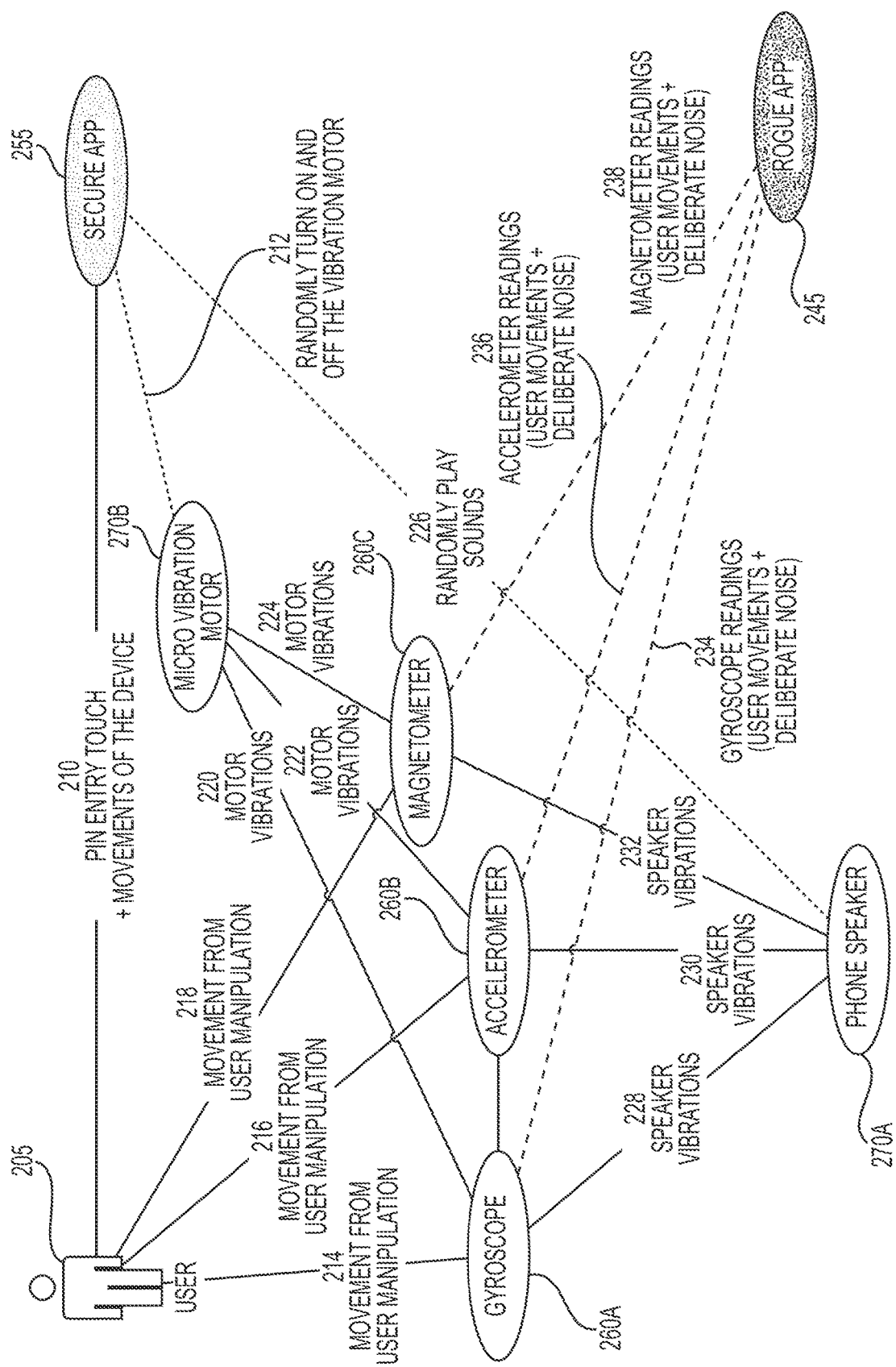
FIG. 2 depicts a conceptual infrastructure for a point-of-sale (POS) device configured to obfuscate entry of sensitive data, according to one aspect of the present disclosure.

FIG. 2 depicts an exemplary conceptual infrastructure by which a point-of-sale (POS) device may be configured to obfuscate entry of sensitive data, according to one aspect of the present disclosure. In particular, FIG. 2 depicts an exemplary conceptual or system infrastructure of a point-of-sale (POS) device 125 that is infected with a rogue application 245, a type of malicious application 140 configured to harvest sensitive data input by a user. Such a POS device 125 may comprise a secure application 255, a rogue application 245 (which may be a type of malicious application 140 installed on the POS device 125, as alluded to above), sensors including a gyroscope 260A, an accelerometer 260B, and a magnetometer 260C, and noise generating components including a micro vibration motor 260B and a phone speaker 270A.

User 205 (i.e., a consumer, a customer, etc.) may submit sensitive data (e.g., PIN) at the POS device 125, as shown in step 210. For the sake of brevity, only the case of a PIN entry will be discussed in the following sections. However, it should be noted that the contemplated embodiments may be applicable to transactions involving various types of sensitive data that can be stolen, detected, or harvested by the rogue application 245. The movements associated with the PIN entry and/or the prompt displayed to the user 205 for PIN entry may alert the secure application 255 to initiate security measures. Concurrently, the movements associated with the PIN entry may be captured by the sensors of the POS device 125, such as a gyroscope 260A, an accelerometer 260B, and/or a magnetometer 260C, as indicated by the steps 214, 216, and 218, respectively. The combination of gyroscope 260A, accelerometer 260B, and/or magnetometer 260C readings can represent movements associated with entry of each number in the PIN. In one embodiment, a combination of the gyroscope, 260A accelerometer 260B, and magnetometer 260C readings can be used to detect both the orientation and movement of the POS device 125. The gyroscope 260A may measure the rotation of the POS device 125, measured around the X, Y and Z axis. The accelerometer 260B may measure the vector displacement of the POS device 125 in three dimensions in relation to the X, Y and Z axis. The magnetometer 260C may be a built-in magnetic compass that may be used alongside the gyroscope 260A to calculate a reference in relation to the magnetic north.

If there is no secure application 255 installed on the POS device 125, the sensor readings may accurately represent the movements of the POS device 125 caused by the user 205 (i.e., user-caused movements), and the readings representative of the user-caused movements would be transmitted to the rogue application 245 for PIN prediction. For instance, using machine learning, an artificial intelligence (AI) system (e.g., a machine learning model) may gradually be trained to recognize the user-caused movement patterns that relate to entry of each number at the POS device 125. The rogue application 245 may then be able to predict the PIN using the trained machine learning model.

To remove or mitigate this security vulnerability, secure application 255 may be installed on the POS device 125 to obfuscate the PIN entry. Secure application 255, upon determining that PIN entry has been initiated, may send noise data through the POS device 125 (i.e., to the sensors of the POS device 125) to prevent the rogue application 245 from receiving "unbiased" readings from the sensors. For example, secure application 255 may direct a micro vibration motor 270B to randomly turn on and off (or up and down) during PIN entry, as shown in step 212. Randomly turning on/off (or up/down) the micro vibration motor 270B may deliver random motor vibrations 220 to the gyroscope 260A, random motor vibrations 222 to the accelerometer 260B, and random motor vibrations 224 to the magnetometer 260C during PIN entry. The secure application 255 may further direct a phone speaker 270A to randomly turn on and off (or up and down) during PIN entry, as shown in step 226. Randomly turning on/off (or up/down) the phone speaker 270A may deliver random speaker vibrations 228 to the gyroscope 260A, random speaker vibrations 230 to the accelerometer 260B, and random speaker vibrations 232 to the magnetometer 260C during PIN entry. The random vibrations (i.e., vibrations with random patterns) generated by the phone speaker 270A and the micro vibration motor 270B may add "noise" to the readings representative of the user-caused movements during PIN entry. As a result, the gyroscope readings 234, accelerometer readings 236, and magnetometer reading 238 received by the rogue application 245 may be "noisy," and may be representative of the combined effects of the user-caused movements and the movements caused by the secure application 255. Therefore, rogue application 245 may not be able predict the PIN accurately, as the received readings are not purely reflective of the user-caused movements.

Figure 3:
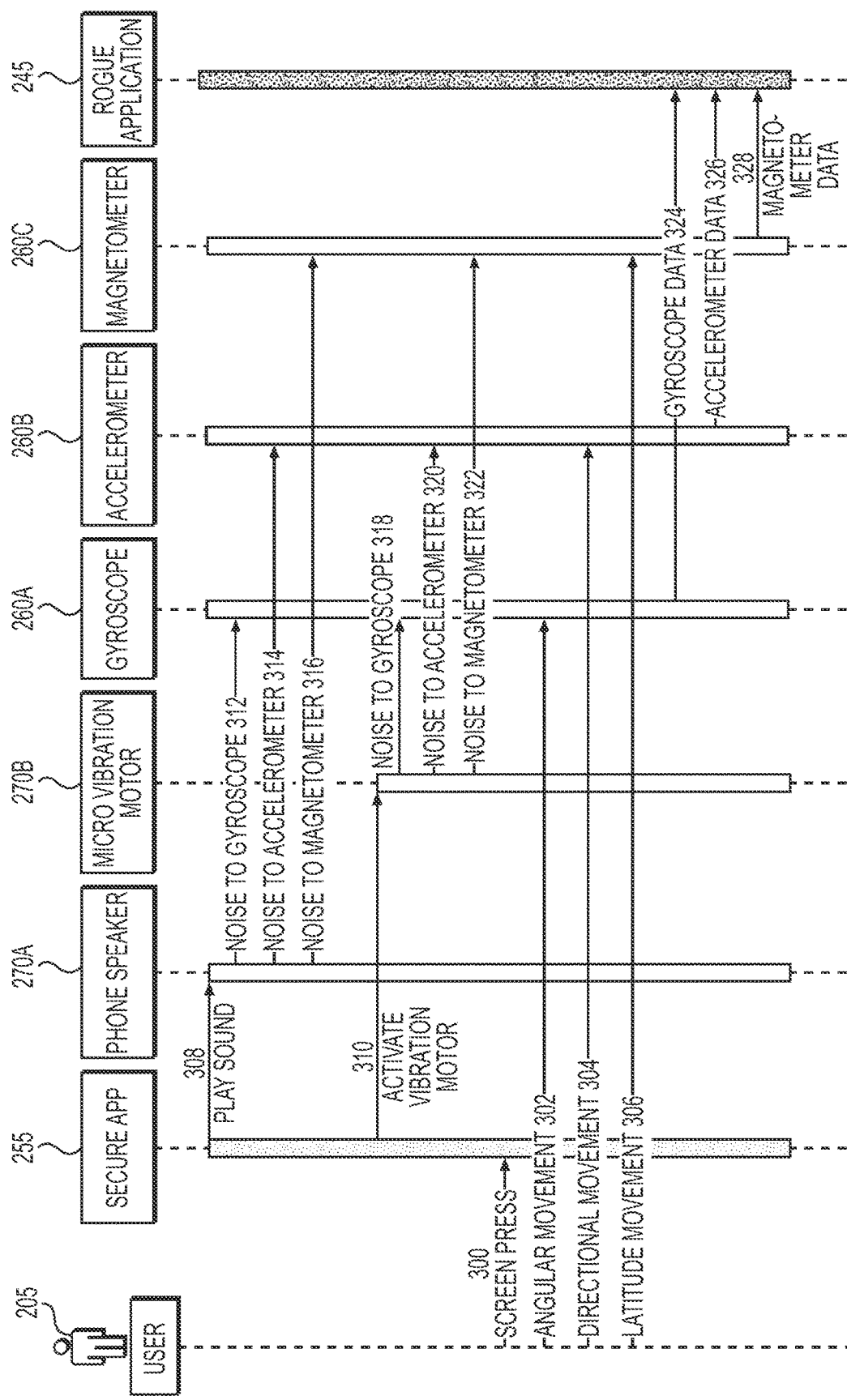
FIG. 3 depicts a process flow diagram of a method of obfuscating entry of sensitive data, according to one aspect of the present disclosure.

FIG. 3 depicts a process flow diagram of a method of obfuscating entry of sensitive data, according to one aspect of the present disclosure. As shown in FIG. 3, at step 300, user 205 may start entering the PIN at the POS device 125 by pressing a series of digits making up the PIN combination. The secure application 255 may be notified of the beginning of the PIN entry. At step 302, during the PIN entry, an angular movement of the POS device 125 caused by the user 205 entering the PIN number (i.e., each digit of the PIN) may be transmitted to a gyroscope 260A of the POS device 125. At step 304, which may occur concurrently or substantially concurrently with step 302, a directional movement of the POS device 125 caused by the user 205 entering the PIN number (i.e., each digit of the PIN) may be transmitted to an accelerometer 260B of the POS device 125. At step 306, which may occur concurrently or substantially concurrently with step 304, a latitude movement of the POS device 125 caused by the user 205 entering the PIN number (i.e., each digit of the PIN) may be transmitted to a magnetometer 260C of the POS device 125.

Upon the secure application 255 being notified of the PIN entry initiation, at step 308, the secure application 255 may direct a phone speaker 270A of the POS device 125 to play random sounds, thereby causing the POS device 125 to vibrate randomly due to the sound waves. The random vibrations may deliver noise (i.e., act as noise) to the sensors of the POS device 125 including the gyroscope 260A, accelerometer 260B, and magnetometer 260C, as shown in steps 312, 314, 316. Further, upon the secure application 255 being notified of the PIN entry initiation, at step 310, the secure application 255 may also direct a micro vibration motor 270B of the POS device 125 to randomly turn on/off (up/down), thereby causing the POS device 125 to vibrate randomly. The random vibrations may add to the noise delivered to the sensors of the POS device including the gyroscope 260A, accelerometer 260B, and magnetometer 260C, as shown in steps 318, 320, 322.

The sensor readings resulting from the combined effects of the user-caused movements (i.e., the movements of the POS device 125 caused by the user 205 entering the PIN) and the movements caused by the secure application 255 (i.e., the movements of the POS device 125 caused by the random vibrations generated by the phone speaker 270A and/or the micro vibration motor 270B) may then be transmitted to the rogue application 245, as shown in steps 324, 326, 328. As described above in reference to FIG. 2, the readings may not be reflective solely of the user-caused movements of the POS device 125. The readings may in fact be "noisy" due to the random vibrations applied by the secure application 255. As a result, the rogue application 245 may not be able to predict the PIN accurately. As the rogue application 245 relies upon accurate, "pure" readings from the sensors, even a very small amount of interference from the applied vibrations may substantially lower the PIN prediction accuracy. Another advantage may be that, playing randomized sounds while the user inputs the PIN may cause a minor distraction to the user's muscle memory method of entering information, and may reduce the chances of pattern recognition by the rogue application 245.

Figure 4:
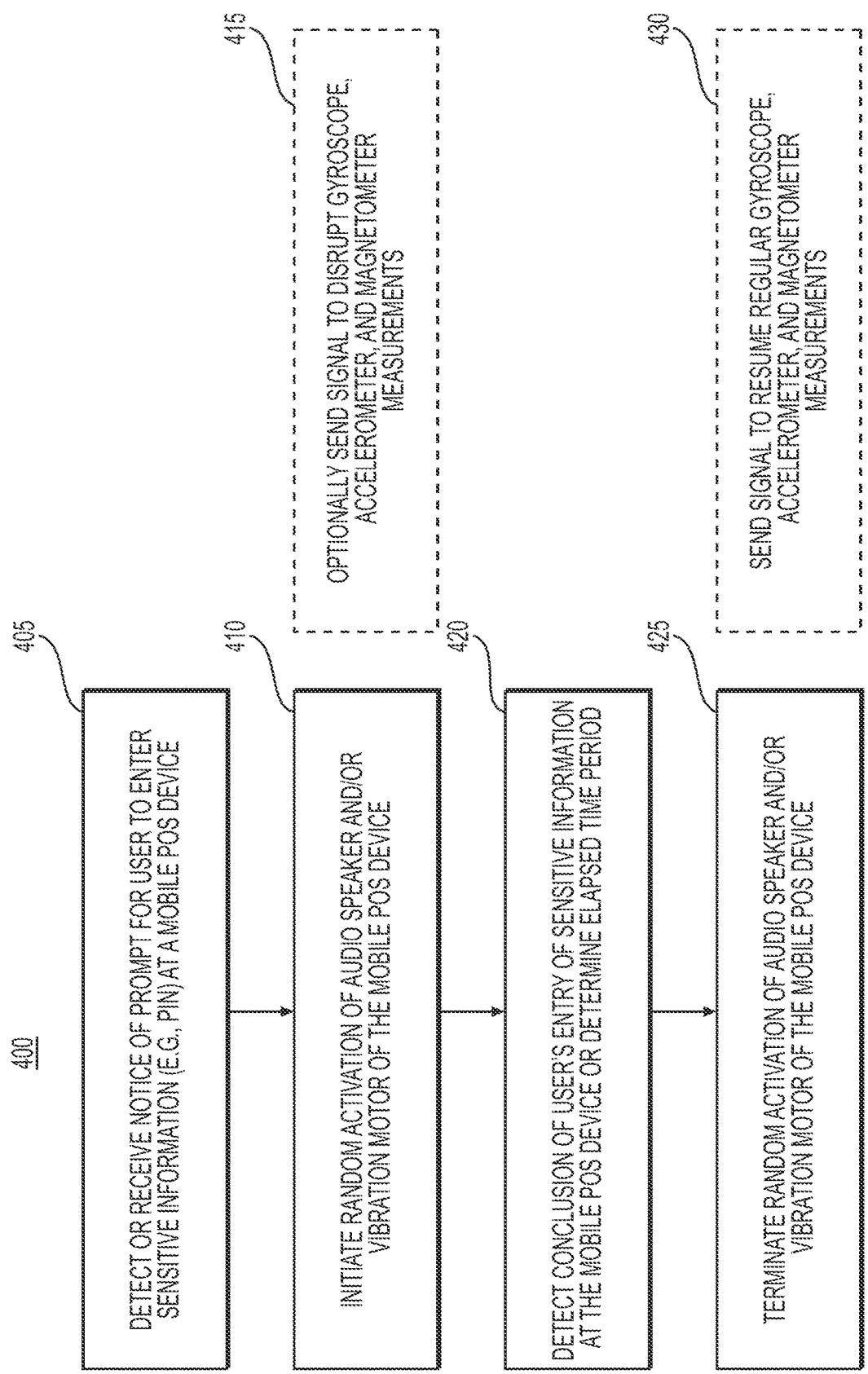
FIG. 4 depicts a flowchart of a method of obfuscating entry of sensitive data, according to one aspect of the present disclosure.

FIG. 4 depicts a flowchart of a method of obfuscating entry of sensitive data, according to one aspect of the present disclosure. The steps of method 400 may be performed by the secure application 255. At step 405, the secure application 255 may detect or receive notice of prompt for a user to enter sensitive information such as, e.g., PIN, at a POS device 125. At step 410, the secure application 255 may initiate random activation of a phone speaker 270A and/or a vibration motor 270B of the POS device 125, to add "noise" to the sensor readings (i.e., gyroscope, accelerometer, and/or magnetometer readings) representative of user-caused movements of the POS device 125.

Additionally or alternatively, at step 415 (which may take place concurrently or substantially concurrently with step 410), the secure application 255 may send signals/commands directly to the sensors (i.e., gyroscope, accelerometer, and/or magnetometer), to alter the sensor readings representative of user-caused movements of the POS device 125. For example, the secure application 255 may send commands to turn off one or more of the sensors, disabling transmission of sensor readings to the rogue application 245. Alternatively, the secure application 255 may send signals that may alter the sensor readings, such that the altered sensor readings no longer accurately represent the user-caused movements of the POS device 125. Such signals may cause the sensors to operate in a faulty or unpredictable manner so as to cause false readings to be transmitted to the rogue application 125. For instance, the signals may add "noise" to the sensor readings (i.e., render sensor readings inaccurate) without activating other components of the POS device 125, such as the phone speaker 270A or the vibration motor 270B.

With continuing reference to FIG. 4, at step 420, the secure application 255 may detect conclusion of user's entry of sensitive information at the POS device 125, or may determine that a predetermined time period has elapsed without correct PIN entry. At step 425, the secure application 255 may terminate the random activation of the phone speaker 270A and/or the vibration motor 270B of the POS device 125. Additionally or alternatively, if the secure application 255 previously performed step 415, the secure application 255 may send signals/commands to the sensors to resume regular measurements (i.e., to resume normal operation) at step 430 (which may take place concurrently or substantially concurrently with step 425). For instance, the signals/commands sent at step 430 may halt altering of the sensor readings, which was previously triggered at step 415, and may resume normal measurements.

It should be noted that, although the steps of FIG. 4 are described as being performed by a secure application 255 installed on a merchant's POS device 125, such an application may also be installed on a customer user device 145 and enable obfuscation of sensitive data entry at the customer user device 145. In fact, the secure application 255 may be installed on any mobile device that enables a user to enter sensitive information in order to use a website, a mobile application, etc., or to perform a secure transaction. In modern days, entry of sensitive data is required in a variety of contexts. To name a few, a bank ATM machine, a website, a mobile application, an answering machine, a door lock, etc. may be connected to a network 160 and may require a user to enter sensitive data as a form of authentication. Therefore, the embodiments discussed in the present disclosure may be applicable in any context in which a threat of data theft exists, and in which a need to obfuscate entry of sensitive data may arise.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 5:
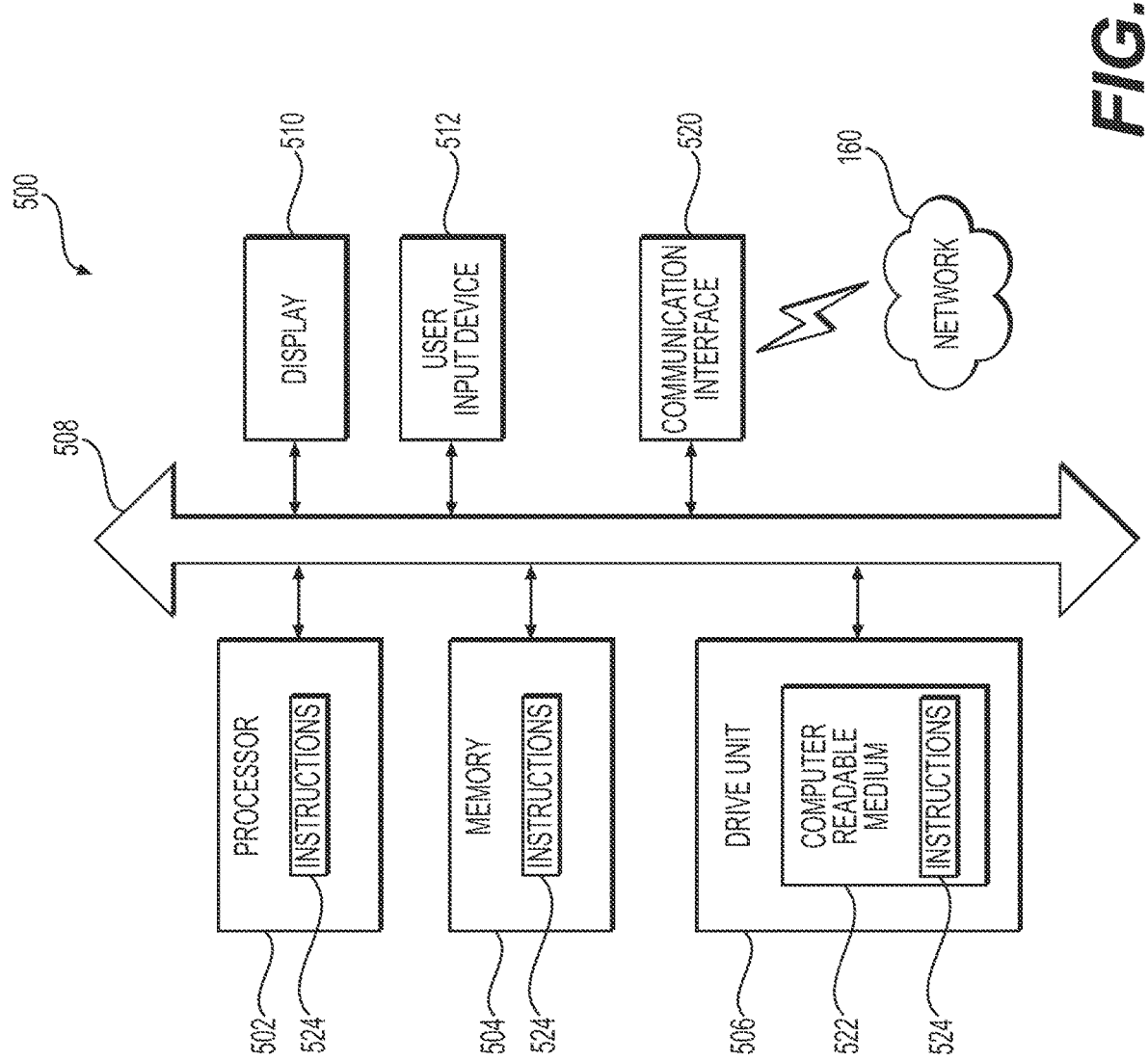
FIG. 5 illustrates an implementation of a general computer system that may execute techniques presented herein.

FIG. 5 illustrates an implementation of a general computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g. software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 160 can communicate voice, video, audio, images, or any other data over the network 160. Further, the instructions 524 may be transmitted or received over the network 160 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 160, external media, the display 510, or any other components in system 500, or combinations thereof. The connection with the network 160 may be a physical connection, such as a wired Ethernet connection or may be established wirelessly as discussed below. Likewise, the additional connections with other components of the system 500 may be physical connections or may be established wirelessly. The network 160 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 160. The network 160 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 160 may include wide area networks (WAN), such as the Internet, local area networks (LAN), campus area networks, metropolitan area networks, a direct connection such as through a Universal Serial Bus (USB) port, or any other networks that may allow for data communication. The network 160 may be configured to couple one computing device to another computing device to enable communication of data between the devices. The network 160 may generally be enabled to employ any form of machine-readable media for communicating information from one device to another. The network 160 may include communication methods by which information may travel between computing devices. The network 160 may be divided into sub-networks. The sub-networks may allow access to all of the other components connected thereto or the sub-networks may restrict access between the components. The network 160 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for obfuscating entry of sensitive data in a point-of-sale (POS) device infected with a rogue application, comprising:
    generating a user interface element in a user interface of the POS device for at least one user to enter the sensitive data;
    detecting, via one or more sensors, a movement of the POS device, one or more movement patterns of the at least one user while entering the sensitive data, or a combination thereof;
    instructing, by a secure application, a phone speaker to generate noise data for a predetermined time period, wherein sound waves from the noise data causes the POS device to vibrate, and wherein the vibration causes a noisy sensor readings; and
    transmitting, by the secure application, the noisy sensor readings to the rogue application configured to determine the sensitive data using the one or more sensors of the POS device.

2. The computer-implemented method of claim 1, further comprising:
    altering, by the secure application, a sensor readings of the movement of the POS device, the one or more movement patterns of the at least one user, or a combination thereof,
    wherein the altering includes turning off the one or more sensors, disabling a transmission of the sensor readings, or a combination thereof.

3. The computer-implemented method of claim 2, wherein the altering of the sensor readings further comprising:
    transmitting, by the secure application, one or more signals to the one or more sensors to add noise to the sensor reading and causing the one or more sensors to generate false readings; and
    transmitting, by the secure application, the false readings to the rogue application.

4. The computer-implemented method of claim 3, further comprising:
    detecting, by the secure application, a conclusion of the sensitive data entry by the at least one user; and
    instructing, by the secure application, to the one or more sensors to resume regular measurements.

5. The computer-implemented method of claim 1, further comprising:
    detecting, by the secure application, a conclusion of the sensitive data entry by the at least one user; and
    terminating, by the secure application, an operation of the phone speaker from generating the noise data.

6. The computer-implemented method of claim 1, further comprising:
    determining, by the secure application, the predetermined time period to enter the sensitive data has elapsed; and
    terminating, by the secure application, an operation of the phone speaker from generating the noise data.

7. The computer-implemented method of claim 1, further comprising:
    instructing, by the secure application, a vibration motor of the POS device to randomly turn on or turn off during the entry of the secure data to deliver random motor vibrations to the one or more sensors.

8. The computer-implemented method of claim 1, wherein the noise data includes randomized sounds generated by the phone speaker of the POS device, and wherein the randomized sounds changes the movement patterns of the at least one user while entering the sensitive data by causing distractions to a muscle memory of the at least one user.

9. The computer-implemented method of claim 1, wherein the movement of the POS device includes an angular movement, a directional movement, a latitude movement, or a combination thereof.

10. The computer-implemented method of claim 1, wherein the one or more sensors include a gyroscope to measure a rotation of the POS device, an accelerometer to measure a vector displacement of the POS device in a three-dimensional space, a magnetometer to measure a magnetic field, or a combination thereof.

11. A system for obfuscating entry of sensitive data in a point-of-sale (POS) device infected with a rogue application, comprising:
    one or more processors; and
    a non-transitory computer readable medium storing instructions which, when executed by the one or more processors, cause the one or more processors to perform a method comprising:
        generating a user interface element in a user interface of the POS device for at least one user to enter the sensitive data;
        detecting, via one or more sensors, a movement of the POS device, one or more movement patterns of the at least one user while entering the sensitive data, or a combination thereof;
        instructing, by a secure application, a phone speaker to generate noise data for a predetermined time period, wherein sound waves from the noise data causes the POS device to vibrate, and wherein the vibration causes a noisy sensor readings; and
        transmitting, by the secure application, the noisy sensor readings to the rogue application configured to determine the sensitive data using the one or more sensors of the POS device.

12. The system of claim 11, further comprising:
    altering, by the secure application, a sensor readings of the movement of the POS device, the one or more movement patterns of the at least one user, or a combination thereof, wherein the altering includes turning off the one or more sensors, disabling a transmission of the sensor readings, or a combination thereof.

13. The system of claim 12, wherein the altering of the sensor readings further comprising:
transmitting, by the secure application, one or more signals to the one or more sensors to add noise to the sensor reading and causing the one or more sensors to generate false readings; and
transmitting, by the secure application, the false readings to the rogue application.

14. The system of claim 13, further comprising:
detecting, by the secure application, a conclusion of the sensitive data entry by the at least one user; and
instructing, by the secure application, to the one or more sensors to resume regular measurements.

15. The system of claim 11, further comprising:
detecting, by the secure application, a conclusion of the sensitive data entry by the at least one user; and
terminating, by the secure application, an operation of the phone speaker from generating the noise data.

16. The system of claim 11, further comprising:
determining, by the secure application, the predetermined time period to enter the sensitive data has elapsed; and
terminating, by the secure application, an operation of the phone speaker from generating the noise data.

17. The system of claim 11, further comprising:
instructing, by the secure application, a vibration motor of the POS device to randomly turn on or turn off during the entry of the secure data to deliver random motor vibrations to the one or more sensors.

18. A non-transitory computer readable medium for obfuscating entry of sensitive data in a point-of-sale (POS) device infected with a rogue application, the non-transitory computer readable medium storing instructions that, when executed by one or more processors, cause the one or more processors to perform a method comprising:
generating a user interface element in a user interface of the POS device for at least one user to enter the sensitive data;
detecting, via one or more sensors, a movement of the POS device, one or more movement patterns of the at least one user while entering the sensitive data, or a combination thereof;
instructing, by a secure application, a phone speaker to generate noise data for a predetermined time period, wherein sound waves from the noise data causes the POS device to vibrate, and wherein the vibration causes a noisy sensor readings; and
transmitting, by the secure application, the noisy sensor readings to the rogue application configured to determine the sensitive data using the one or more sensors of the POS device.

19. The non-transitory computer readable medium of claim 18, further comprising:
altering, by the secure application, a sensor readings of the movement of the POS device, the one or more movement patterns of the at least one user, or a combination thereof,
wherein the altering includes turning off the one or more sensors, disabling a transmission of the sensor readings, or a combination thereof.

20. The non-transitory computer readable medium of claim 19, wherein the altering of the sensor readings further comprising:
transmitting, by the secure application, one or more signals to the one or more sensors to add noise to the sensor reading and causing the one or more sensors to generate false readings; and
transmitting, by the secure application, the false readings to the rogue application.

* * * * *